United States Patent Office

2,803,618
Patented Aug. 20, 1957

2,803,618

COMPOSITIONS OF MATTER COMPRISING FURFURAL AND KETONE-FURFURAL REACTION PRODUCTS

Mortimer T. Harvey, South Orange, N. J., assignor to Harvel Research Corporation, a corporation of New Jersey No Drawing. Application March 15, 1954,
Serial No. 416,424

20 Claims. (Cl. 260—41)

This invention relates to novel compositions of matter and to methods for preparing them and also to novel products containing one or more of said novel compositions as components thereof and also to methods for producing them. In one of its specific aspects the invention is directed to novel compositions (I) which, when a 100 gram sample thereof is mixed with 20 grams of an alcoholic solution of paratoluene-sulfonic acid containing equal parts by weight of alcohol and said acid, are capable of being heat converted at 300° F. to the substantially solid and infusible state within 24 hours and also to such compositions (I) converted to the substantially solid and infusible state.

Said novel compositions (I) have a viscosity no greater than 5000 centipoises at 25° C. and all comprise (A) furfuraldehyde intimately combined with (B) organic reaction product of furfuraldehyde and a ketone, with the ratio of (A) to (B) being 100 parts by weight of (A) to 100–500 parts by weight of (B) depending upon the viscosity of the particular organic reaction product (B) employed and the specific viscosity of the composition (I) desired.

Said organic reaction products (B) may be produced by reacting furfuraldehyde with one or a combination of two or more ketones having at least two hydrogen atoms on an alpha carbon. Examples of specific ketones which may be employed and the method for producing furfuralketone reaction products under alkaline conditions are well known to the art as set forth in the U. S. patents to S. Caplan and M. T. Harvey No. 2,363,829 of November 12, 1949, and to M. T. Harvey No. 2,461,510 of February 15, 1949. All of said specific organic reaction products of said patents and produced by reacting furfural and a ketone under alkaline conditions are examples of products (B) which are used in the practice of this invention, are in all cases liquid at 220° F. And, said products (B) may also be such organic reaction products liquid at 220° F. which have subsequently been polymerized under acidic conditions to liquid or fusible state and being liquid at 220° F. and the method for so polymerizing them is also well known to the art as set forth in the patent to M. T. Harvey, No. 2,461,510.

If desired, said composition (I) may also include (C) one or a combination of two or more of the following: furfuryl alcohol; acid condensation polymerization organic products of furfuryl alcohol in the liquid or fusible state, and liquid at 220° F., examples of which are disclosed in the U. S. patent to M. T. Harvey, No. 2,343,973 of March 14, 1944; furfuryl alcohol-formaldehyde reaction products in their liquid or fusible state and liquid at 220° F. produced by following the method set forth in the U. S. patent to M. T. Harvey, No. 2,343,972 of March 14, 1944; organic reaction products in their liquid or fusible state and liquid at 220° F. produced by reacting formaldehyde with condensation polymerization products of furfuryl alcohol disclosed in the U. S. patent to M. T. Harvey, No. 2,343,973; and liquid or fusible organic reaction products and liquid at 220° F. produced by reacting under acidic conditions formaldehyde with furfural-ketone organic reaction products produced under alkaline conditions disclosed in the U. S. patent to M. T. Harvey, No. 2,363,829. By the term "formaldehyde" is meant formaldehyde as well as its polymers such as paraformaldehyde, etc. When (C) is employed, I prefer that composition (I) comprises by weight 100 parts of (A) to 100–500 parts of (B) and with the ratio by weight of (C) to (B) being 0–100 parts of (C) and preferably 5–100 parts of (C) to each 100 parts of (B) with the viscosity of (I) being no greater than 5000 centipoises at 25° C.

Said novel compositions (I) offer a wide variety of unique and inexpensive compositions of matter which find employment in a number of different fields. All of them may be converted to the substantially solid and infusible state under comparatively low pH conditions and may be employed as casting compositions, electrical insulating compositions, coating compositions for floorings, table tops, to surface wood, metal, etc., to provide protective coatings, as cold setting cements which may be employed as adhesives for tile and other floor coverings, as material for pipes and conduits, as coatings for pipes, conduits, tanks, etc., as joint material for pipes and the like, as tiles, etc. When used for the aforesaid purposes, they are generally loaded with filler carrying an acidic agent to impart the desired pH to the mass. They may be used as impregnants and/or adhesives for the lamination of a wide variety of products such as glass fabric, glass matting, paper, wood, etc., and also may be used in the production of wound tubings of said materials. They may also be used as components in friction elements such as brake linings, clutch facings, etc. In the friction element field they may find application as binders for the asbestos fibers and other components thereof and/or they may be used in providing friction fortifier dusts therefor. They may also be used in combination with rubber materials. They may be combined with rubbery materials such as reclaimed rubber, natural rubber, rubbery polymers of chloroprene, rubbery polymers of butadiene, rubbery copolymers of butadiene and styrene and rubbery copolymers of butadiene and acrylonitrile. The ratio by weight of composition (I) to the rubbery material may be 1–100 parts of composition (I), to 100–1 parts of rubbery material.

Also according to this invention, furfural and one or more of the products (B), with or without (C), in the before mentioned proportions are preferably first heated together to drive off residual water which is not readily removable from products (B) and to cause a more intimate combination of the components and possible reaction of components. The heating is generally carried out at temperatures of up to 300° F. and at pressures of 1 inch of mercury and is continued until the moisture content of the composition is no greater than 0.5% of the weight of the composition (I) and of course in all cases the viscosity of said mass after this heating step shall not be greater than 5000 centipoises at 25° C. Such substantially completely dehydrated compositions (I) find particular application for use in the fields heretofore set forth.

The following Examples 1–13 are given merely to further illustrate some of the methods for providing some of the materials employed in the practice of this invention and are not to be construed in a limiting sense, all parts being given by weight unless otherwise specified.

*Example 1*

Into a 1-gallon pail is placed a quantity of sodium hydroxide weighing 2 lbs. 6 oz. Then there is added thereto sufficient water to fill the pail and the sodium hydroxide in the water is stirred until the sodium hydroxide is completely dissolved therein. Then in a Monel metal lined autoclave are placed 40 lbs. of furfuraldehyde and 34 lbs. of acetone. This autoclave is preferably provided with a mechanical mixer or agitator which may be in the nature of a paddle mixer. This mixture is agitated and while in the state of agitation there is added thereto about ⅙ of the volume of said heretofore prepared aqueous solution of sodium hydroxide. With all the valves of the autoclave closed it will be noted that an exothermic reaction takes place in a very few minutes after the addition of the sodium hydroxide solution and the temperature of the mass continuously agitated by the stirrer will rise to approximately 150° F. in about 3 or 4 minutes. After about 10 minutes there is added to the mass in said autoclave another charge consisting of 40 lbs. furfuraldehyde and 24 lbs. acetone. Then to the mass in the autoclave there is added a second increment of said sodium hydroxide solution equal in volume to the first addition. After a few minutes the temperature of the mass will, due to the exothermic reaction, rise to approximately 165–170° F. The foregoing steps are repeated four more times so that the amount of furfuraldehyde and acetone added to the autoclave are equal to 240 lbs. and 144 lbs. respectively and all of the initially prepared aqueous solution of sodium hydroxide has been added. After the last addition of sodium hydroxide the temperature of the mass within the autoclave will have stabilized to about 180–195° F. Then the mass within the autoclave may be heated by means of a steam coil located therein and through a jacket carried thereby to maintain the temperature of the mass between approximately 185–190° F. for about 30 minutes in order to complete the reaction and to obtain high yields. The steam is cut off from the coil and jacket and then there is added thereto an aqueous solution of sulfuric acid in quantities sufficient to render the mass practically neutral. In this instance there may be added an aqueous solution of sulfuric acid consisting of 3 lbs. 3 oz. of concentrated sulfuric acid diluted in 6 lbs. 6 oz. of water. Then this mass may be heated for about 5 minutes at a temperature between 175–200° F. to substantially completely neutralize the mass. The substantially neutral mass may then be substantially completely dehydrated by heating the mass to a temperature of 220° F. with or without vacuum, yielding approximately 300 lbs. of dehydrated substantially neutral material known as Product B–1 whose viscosity at 25° C. is 92 cp., and having a specific gravity at 25° C. of 1.150.

*Example 2*

200 grams of mesityl oxide, 195 grams of furfural and 4 grams of sodium hydroxide in 8 cc. of water were mixed together whereupon an exothermic action ensues and is allowed to proceed. After it terminates, the mass is refluxed at 200–230° F. for a period of approximately 1 hour. The mass is dehydrated at 160° C. whereupon 300 grams of oily furfural-mesityl oxide reaction product is obtained, has a viscosity of about 100 centipoises at 25° C. and is hereinafter known as Product B–2.

Employing the process set forth in Example 2 but using the materials set forth in the quantities stated in the respectively numbered Examples 3–13, there are obtained particular furfural-ketone reaction Products B–3 to B–13 respectively.

*Example 3*

96 grams of furfural, 72 grams of methyl ethyl ketone and 4.4 cc. of a 33% solution of sodium hydroxide in water were used to produce product B–3.

*Example 4*

100 grams of furfural, 100 grams methyl isobutyl ketone and 1 gram sodium hydroxide in 2 grams of water were used to produce Product B–4.

*Example 5*

200 grams of furfural, 232 grams diacetone alcohol and 1 gram sodium hydroxide in 1 gram of water were used to produce Product B–5.

*Example 6*

100 grams of furfural, 138 grams isophorone and 5 grams sodium hydroxide in 10 grams of water were used to produce Product B–6.

*Example 7*

96 grams of furfural, 138 grams of phorone and 1 gram sodium hydroxide in 2 grams of water were used to produce Product B–7.

*Example 8*

96 grams of furfural, 98 grams of cyclohexanone and 1 gram sodium hydroxide in 2 grams of water were used to produce Product B–8.

*Example 9*

96 grams of furfural, 120 grams acetophenone and 1 gram sodium hydroxide in 2 grams of water were used to produce Product B–9.

*Example 10*

96 grams of furfural, 114 grams of methyl n-amyl ketone and 1 gram of sodium hydroxide in 2 grams of water were used to produce Product B–10.

*Example 11*

96 grams of furfural, 14 grams of acetonyl acetone and 1 gram of sodium hydroxide in 2 grams of water were used to produce Product B–11.

*Example 12*

96 grams of furfural, 86 grams of diethyl ketone and 1 gram of sodium hydroxide in 2 grams of water were used to produce Product B–12.

*Example 13*

96 grams of furfural, 140 grams of diisobutyl ketone and 20 grams of sodium hydroxide in 40 grams of water were used to produce Product B–13.

Said reaction Products B–1 to B–13 either alone or in combination of two or more of them may be thickened under acidic conditions in the manner now known to the art to increase the viscosity thereof at 25° C. to a value at least twice that of the respective Products B–1 to B–13 but to a value no greater than such when combined with 1–5 its weight of furfural will provide a mass or solution no greater than 5000 cp. at 25° C. Such thickened Products B–1 to B–13 are respectively known as B–14 to B–26 and when thickened under acidic conditions have a viscosity of at least about 200 centipoises at 25° C. and the degree of thickening of Products B–1 to B–13 is controlled so that in all cases it is liquid at 220° F. and also depends upon the amount of furfuraldehyde between the limits heretofore set forth is to be employed and the viscosity of compositions (I) desired, but with the viscosity of composition (I) to be no greater than 5000 centipoises at 25° C.

The general method for thickening said Products B–1 to B–13 is described in the patent to M. T. Harvey, No. 2,461,510 and in general consists of adding an acidic agent thereto to reduce the pH thereof to a value 0.35 to 3. For the purposes of this invention an acidic agent is employed in such amount that the pH of the mass is about 1.5. Then the so pH-modified mass is heated externally until the mass has been thickened to the desired viscosity. At this stage the mass is immediately and rapidly cooled to room temperature and if desired an alkaline material such as sodium hydroxide, potassium hydroxide or lime may be added during the cooling step to aid in stopping the thickening.

According to this invention one or a combination of two or more of said Products B–1 to B–26 is combined and in general dissolved in furfural, with the ratio by weight of Products B–1 to B–26 to furfural being at least about 100 parts of the latter to 500 parts of the former and with no more than about 100 parts of the latter to 100 parts of the former to provide novel compositions (I) each having a viscosity at 25° C. no greater than 5000 centipoises. In all cases for best results it is preferred that the pH of the Products B–1 to B–26 be first adjusted so that they are approximately neutral and that any salts of neutralization be filtered out.

The following are specific examples of said novel compositions (I) which are given merely by way of illustration and not by way of limitation, all parts being given by weight unless otherwise specified.

*Example 14*

75 parts of B–1 and 25 parts of furfural were mixed together to provide a uniform mass or solution and this solution was subsequently heated to and maintained in the temperature range of approximately 150–300° F. under reduced pressure conditions of approximately a pressure of 1 inch mercury for about 30 minutes whereupon practically all of the water therein has been removed therefrom to provide a composition whose water content measures less than 0.5% of the weight thereof. The resultant composition (I) B–1 is cooled and is a thin free flowing liquid having a viscosity at 25° C. greatly less than 5000 centipoises and even less than 50 centipoises.

The procedure set forth in Example 14 is employed in Examples 15 to 32 with the particular components set forth in said examples as hereinafter indicated to provide the respective compositions hereinafter identified therein and all having viscosities no greater than 5000 centipoises at 25° C. and containing less than 0.5% by weight of water, if any.

*Example 15*

80 parts Product B–2
20 parts furfural
Resultant composition (I) B–2.

*Example 16*

100 parts Product B–3 (viscosity approx. 200 cp. at 25° C.)
60 parts furfural
Resultant composition (I) B–3.

*Example 17*

100 parts Product B–4 (viscosity approx. 200 cp. at 25° C.)
50 parts furfural
Resultant composition (I) B–4.

*Example 18*

100 parts of Product B–11 (viscosity approx. 20,000 cp. at 25° C.)
100 parts furfural
Resultant composition (I) B–11.

*Example 19*

100 parts of Product B–14 (viscosity approx. 400 cp. at 25° C.)
100 parts furfural
Resultant composition (I) B–14.

*Example 20*

100 parts Product B–15 (viscosity approx. 500 cp. at 25° C.)
40 parts furfural
Resultant composition (I) B–15.

*Example 21*

100 parts B–18 (viscosity approx. 1000 cp. at 25° C.)
80 parts furfural
Resultant composition (I) B–18.

*Example 22*

100 parts of Product B–24 (viscosity approx. 50,000 cp. at 25° C.)
100 parts furfural
Resultant composition (I) B–24.

*Example 23*

50 parts Product B–1
50 parts Product B–14 (viscosity approx. 500 cp. at 25° C.)
100 parts furfural
Resultant composition (I) B–1–14.

*Example 24*

75 parts Product B–1
25 parts Product B–24 (visc. approx. 50,000 cp. at 25° C.)
75 parts furfural
Resultant composition (I) B–1–24.

All of said compositions (I) of furfural and one or more of Products B–1 to B–26 may, if desired, also include one or a combination of two or more of the products (C) hereinbefore particularly defined and in the proportions set forth and so chosen that the viscosity of the resultant composition (I) shall be no greater than 5000 cp. at 25° C., and the following are specific examples thereof given merely by way of illustration. In all cases the resultant compositions (I) of Examples 25–32 will have a viscosity no greater than 5000 cp. at 25° C. and a moisture content, if any, of no greater than 0.5%. The method for producing such compositions is the same as that set forth in Example 14, the ratio of components are set forth in the specific examples and the resultant compositions identified.

*Example 25*

100 parts of Product B–1
50 parts of furfuryl alcohol
100 parts of furfural
Resultant composition (I) B–1C–1.

*Example 26*

400 parts of Product B–3 (viscosity 100 cp. at 25° C.)
400 parts furfuryl alcohol-formaldehyde reaction product (viscosity 1,000 cp. at 25° C.)
400 parts furfural
Resultant composition (I) B–3C–2.

*Example 27*

100 parts B–3 (viscosity approx. 100 cp. at 25° C.)
100 parts of acid condensation polymerization organic product of furfuryl alcohol described in Example B of U. S. Patent 2,343,973 and having a viscosity at 25° C. of 50 cp.
40 parts furfural
Resultant composition (I) B–3C–3.

*Example 28*

100 parts of Product B–1
10 parts of the thick tacky resin produced by reacting acid condensation polymerization organic product of Example 26 reacted with formaldehyde as disclosed in Example 5 of U. S. Patent 2,343,973.
100 parts furfural
Resultant composition (I) B–1C–4.

*Example 29*

100 parts of Product B–2
20 parts furfuryl alcohol-paraformaldehyde organic liquid reaction product of Example 10 of U. S. Patent 2,343,972
60 parts of furfural
Resultant composition (I) B–2C–5.

Example 30

100 parts of Product B-1
10 parts of furfural-ketone-formaldehyde viscous resin disclosed in Example 3 of U. S. Patent 2,363,829.
75 parts of furfural
Resultant composition (I) B-1C-6.

Example 31

100 parts of Product B-1
20 parts furfuryl alcohol
20 parts of acid condensation polymerization product used in Example 27
20 parts of furfural
Resultant composition (I) B-1C-1-3.

Example 32

100 parts of Product B-1
5 parts of furfuryl alcohol-formaldehyde reaction product used in Example 26
5 parts of furfural-ketone-formaldehyde resin of Example 30
50 parts of furfural
Resultant composition (I) B-2C-2-6.

All of said novel compositions (I), examples of which are the resultant compositions of Examples 14-32 are characterized as having a viscosity no greater than 5000 centipoises at 25° C., a moisture content, if any, below about 0.5% by weight of the mass and when a 100 gram sample thereof is mixed with a 20 gram solution of equal parts by weight of paratoluene sulfonic acid and alcohol, such mixture is capable of being heat converted to the substantially solid and infusible state when maintained at 300° F. for 24 hours. Said compositions (I) are readily pourable liquids which are homogeneous and in general for all practical purposes may be termed solutions.

These compositions (I) may be converted to the substantially solid and infusible state by employing a cationic catalyst in the desired proportions dependent upon the speed of reaction required, and whether or not external heat is to be applied and the degree and extent thereof. Examples of some of such catalysts are paratoluene sulfonic acid, diethyl sulfate, sulfuric acid, hydrochloric acid, hydrobromic acid, boron trifluoride, mono-, butyl- and propyl phosphate, phenol sulfonic acid, xylenol sulfonic acid, fluoroboric acid, cresol sulfonic acid, naphthol sulfonic acid, etc. For most purposes, the quantity of catalyst employed with compositions (I) is such that the pH of the resultant mass is no greater than approximately 3.5, and in some cases where cold setting is required may be as low as 0.5 or less, dependent on the desired speed of cure, temperature employed in curing and the particular individual components of composition (I). The method for measuring the pH may be that described in U. S. Patent 2,600,403.

Any of said compositions (I) may be used in the arts heretofore set forth. The following Examples 33 and 34 are given merely by way of illustrating their use in the field of friction elements, such as brake linings and clutch facings.

Example 33

A length of woven or pressed, felted or matted asbestos of the desired dimensions and of the type commonly employed in the production of brake linings is first deaerated and dehydrated and then is soaked in a bath consisting of 100 parts by weight of composition (I) B-1C-2 of Example 26, for example, and 10 parts by weight of diethyl sulphate to coat and impregnate the fibers thereof. Then after about 3 hours of soaking, the excess composition (I) is removed and the coated-impregnated asbestos is allowed to drain over night. Then it is cut into the desired lengths, placed around a form, and under pressure heated to 150° F. and then gradually from 150° F. to 450° F. over a 24-hour period. Then it is removed from the oven, allowed to cool to room temperature. The composition (I) therein will be found to have been cured to the dry, substantially solid and infusible state having good frictional properties.

Example 34

Instead of employing said composition (I) as binders and frictional materials with asbestos for brake linings, said materials may be prepared in the form of comminuted materials and then incorporated in a binder for said asbestos and are retained in said binder as discrete particles. The binder employed may be any of those known to the art such as rubber, phenol-aldehyde resins, heat polymerized drying oils and the like or combinations of these or other materials heretofore used for this purpose.

A quantity of one of said compositions (I) together with 5% toluene sulphonic acid is poured into shallow pans and cured for 24 hours at about 300° F.-400° F. After that period, it will have been converted to the substantially dry, solid and infusible state. This dry mass is then comminuted in any convenient manner, by using, for example, differential rolls or a hammer mill. The mass is comminuted so that there is provided a relatively fine dust whose particle size is below about 20 mesh per square inch. This friction augmenting dust may be combined with the asbestos and binder therefor in the manner heretofore employed for the incorporation of dusts as components of brake linings. The usual manner is to incorporate in a brake lining of asbestos fibers, 8%-20% of dust based on the weight of the finished product, about double that amount of a binder, together with barytes, carbon black and other materials which may be used therewith.

One of the best uses of these various compositions (I) is in the fields of protective coverings, floorings and cold setting cements. In such fileds, compositions (I) are combined with a filler, which may be in the nature of fine particles or dusts and preferably those which may be impregnated or otherwise will carry the catalyst employed. The particular fillers employed depend upon the characteristics required, cost and other factors. Examples of some are finely comminuted powdered sand, silicon dioxide, aluminum oxide, barium sulphate, calcium sulphate, titanium dioxide, silicon carbide, slate dust, carbon, etc. The ratio by weight of filler to composition (I) in general is 600 parts of filler to 100-3600 parts of composition (I).

The following examples 35 to 53 are given by way of illustrating novel cold setting cements of this invention, all parts being given by weight unless otherwise stated.

Example 35

Into a container is charged 100 pounds of composition (I) B-1 of Example 14. Into a second container is uniformly mixed 200 lbs. of finely divided calcined petroleum carbon (finer than 100 mesh) and 6 lbs. of paratoluene sulfonic acid to provide a substantially dry acidic catalyzed carbon, containing the acid catalyst substantially uniformly distributed throughout the carbon. The entire mass of said acid catalyzed carbon is charged into the composition (I) B-1 and the mixture is stirred until it is substantially uniform throughout. This cold mix may be spread, troweled or in any other manner worked and spread on a surface to be coated. It may be spread on a floor base and is allowed to set at room temperature (70° F.) for 24-48 hours after which it will be found to be a tough, wear resistant coating having good chemical resistance. When applied as a floor covering or coating material, it may be of any desired thickness from 1/16 inch to 1/2 inch or more, depending upon what is desired. It may be used in like manner to coat either the interior or exterior of tank walls, the top or bottom of table tops and the like. It may be used either alone or in combination with other fillers such as asbestos etc. for the manufacture of cold setting tile, brick, tubing, conduits and the like and may be used as a cement for cementing tile, brick, pipe joints, etc.

*Example 36*

100 parts of composition (I) B-2 of Example 15 are charged into a container. Then there is added to said mixture 100 parts of acid catalyzed finely divided carbon containing 8 parts of paratoluene sulfonic acid and produced in the same manner as that set forth in Example 35. The mass is agitated to provide a substantially uniform admixture of the components resulting in a mixture which may be spread or in other manner worked, or spread onto a surface to be coated. The same procedure set forth in Example 35 may be followed to provide a tough, wear resistant coating having good chemical resistance.

*Examples 37–53*

Following the same procedure as that set forth in Example 35 there are employed approximately 100 parts of the respective compositions disclosed in Examples 16–32 for each 175 parts of acid catalyzed carbon black prepared in the manner set forth in the Example 35 and containing approximately 3 to 30 parts and generally about 8 parts of paratoluene sulfonic acid. These respective mixtures are treated in the same manner as that set forth in Example 35 to provide cold setting cements which are applied and cured in the manner set forth in Example 35 to provide tough, wear resistant and chemical resistant coatings.

All of these various cold setting cements described in Examples 35–53 are particularly suitable for the uses heretofore indicated and especially those for coating of table tops, flooring and as binders for brick, tile etc. and for linings of tanks and other places where either good wear resistance or chemical resistance is desired. Of course it is to be understood that the type as well as the amount of filler may be varied and that the proportion of catalyst as well as the particular catalyst may be changed depending upon the speed of setting which may be required. However, it is also to be understood that in one of its more specific aspects the invention is particularly directed to the employment of finely divided carbon black as a filler together with an acidic agent to be combined with one or more of said compositions (I) for the provision of unique, useful and highly novel cold setting cements.

*Example 54*

100 parts of composition (I) B-3 of Example 25 is charged into a mixer. Then 50 parts of carbon filler and catalyzed in the manner set forth in Example 35 and having coupled therewith 5 parts of paratoluene sulfonic acid is charged into said mxer. The mass is then mixed to uniformity and then may be employed as a casting composition by charging it into molds and allowed to remain therein at room temperature for 96 hours and at the end of that period will be found to be dense, substantially solid and infusible resin. By employing this method and employing the desired compositions (I), filler and catalyst in the amounts dictated by the speed of cure required, whether or not heat is to be applied and the characteristics of the ultimate product, there may be cast tough, acid proof parts for pumps, housings, gears, pipes, chemical resistant vessels, table tops, and also molded parts for automobiles, airplanes, etc.

The general procedure of Example 54 or any other method may be employed in the manufacture of grinding wheels, and for such purposes, silicon carbide, aluminum oxide or other abrasive in the desired particle size may be used and such particles are bound together with any of said compositions (I) converted to the solid and infusible state.

When compositions (I) are to be employed as cold setting cements, to be employed as components of a compound for bonding together tile, etc. in flooring or the like, it is preferable that said compositions (I) have a viscosity at 25° C. no greater than 500 centipoises and for best results in that field, no greater than 200 centipoises. However, when used in the field of casting, compositions (I) of greater viscosities and up to 5000 centipoises are generally employed.

It is also within the purview of this invention to employ said compositions (I) in the production of expended solids in the form of a cellular structure or foam. It has been discovered that said compositions (I) may be mixed with a foaming or blowing agent and one or more of said catalysts and such combinations without the application of external heat or pressure will be converted in a short period of time into an expanded resin in the solid and foamy or cellular state and having a volume at least 100 times that of the original combination. Such combinations serve admirably as foam-in-place compositions because the resultant foam or cellular composition will assume the shape of the cavity in which it was produced and will fill it completely. The foaming or blowing agents which I prefer to employ are those which will not release any appreciable amount of gas or vapor until the temperature of the mass has been materially increased. Due to the presence of the acidic agent, an exothermic reaction takes place and in the course of this reaction gas or vapor is liberated from the blowing or foaming agent due to its temperature having been raised to such gas or foam liberating stage. In addition, any water which may have been added to compositions (I) is converted to steam which also contributes to the expansion of the resin. The following is an example of such a combination, all parts given by weight unless otherwise specified.

*Example 55*

100 parts of Product B-1, 50 parts of furfural and 15 parts of a blowing or foaming agent capable of liberating nitrogen at elevated temperature and purchasable on the open market as "Du Pont BL-353 Chemical Blowing Agent" and marketed by E. I. Du Pont de Nemours and Co., Inc. of Wilmington, Delaware, and this agent is capable of releasing 130–135 milliliters of nitrogen per gram of nitrogen releasing compound therein, were mixed together to homogeneity. Then to said mass was added 15 parts of an aqueous solution of fluoboric acid (45% concentration) and quickly stirred therein and immediately poured into a cavity to be filled. In a very short period of time an exothermic reaction ensues converting said combination to a solid cellular or foamy mass completely filling the cavity.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel compositions of matter herein claimed without departing from the spirit of the invention. Particularly it is to be understood that in said claims, ingredients or compounds recited in the singular are intended to include compatible mixtures of said ingredients wherever the sense permits.

Having thus described my invention, what I claim is:

1. A novel composition of matter (I) comprising an intimate combination of (A) furfural and (B) a material selected from the group consisting of (a) furfural-ketone organic reaction products produced by reacting under alkaline conditions furfural and a ketone having two hydrogen atoms on an alpha carbon, (b) said reaction products (a) thickened under acidic conditions and being liquid at 220° F. (c) and mixtures of (a) and (b), the ratio by weight of (A) to (B) being 100 parts of (A) to 100–500 parts of (B).

2. A novel composition defined in claim 1, said composition having a viscosity no greater than 5000 centipoises at 25° C. and moisture content as low as 0 and no greater than 0.5%.

3. A novel composition of matter (I) comprising an intimate combination of (A) furfural and (B) a material selected from the group consisting of (a) furfural-ketone organic reaction products produced by reacting under alkaline conditions furfural and a ketone having two hydrogen atoms on an alpha carbon, (b) said reaction products (a) thickened under acidic conditions and being liquid at 220° F., (c) and mixtures of (a) and (b), and (C) a material selected from the group consisting of (d) furfuryl alcohol, (e) acid condensation-polymerization organic products of furfuryl alcohol, said products being liquid at 220° F., (f) furfuryl alcohol-formaldehyde organic reaction products, said reaction products being liquid at 220° F., (g) organic reaction products liquid at 220° F. and produced by reacting formaldehyde with (e), (h) organic reaction products liquid at 220° F. produced by reacting formaldehyde with (a), (i) mixtures of at least two of said materials (d)–(h) respectively, the ratio by weight of (A) to (B) being 100 parts of (A) to 100–500 parts of (B) and the ratio by weight of (B) to (C) being 100 parts of (B) to 0–100 parts of (C).

4. A novel composition comprising said composition defined in claim 3 and having a viscosity no greater than 5000 centipoises at 25° C. and a moisture content as low as 0 but no greater than 0.5%.

5. A novel composition of matter comprising a filler and an acidic catalyst admixed with a composition defined in claim 1, the ratio of said composition defined in claim 1 to said filler being in the range of about 100–3600 parts by weight of the former to 600 parts by weight of the latter, said novel composition of matter being convertible to the substantially solid and infusible state at room temperature.

6. A novel composition of matter comprising a composition defined in claim 1, converted under acidic conditions to the substantially solid and infusible state.

7. A base coated with a composition defined in claim 1 and converted under acidic conditions to the substantially solid and infusible state.

8. A novel composition of matter (I) comprising an intimate combination of (A) furfural and (B) organic reaction product of acetone-furfural, the ratio by weight of (A) to (B) being 100 parts of (A) to 100–500 parts of (B).

9. A novel composition defined in claim 8 converted under acidic conditions to the substantially solid and infusible state.

10. A novel composition defined in claim 8 having a viscosity no greater than 5000 centipoises at 25° C. and a moisture content as low as 0 but no greater than 0.5%.

11. A novel composition of matter (I) comprising an intimate combination of (A) furfural and (B) an organic reaction product of mesityl oxide-furfural, the ratio by weight of (A) to (B) being 100 parts of (A) to 100–500 parts of (B).

12. A novel composition defined in claim 11 converted under acidic conditions to the substantially solid and infusible state.

13. A novel composition defined in claim 11, having a viscosity no greater than 5000 centipoises at 25° C. and a moisture content as low as 0 but no greater than 0.5%.

14. A novel composition of matter (I) comprising an intimate combination of (A) furfural and (B) an organic reaction product of methyl ethyl ketone-furfural, the ratio by weight of (A) to (B) being 100 parts of (A) to 100–500 parts of (B).

15. A novel composition defined in claim 14 converted under acidic conditions to the substantially solid and infusible state.

16. A novel composition defined in claim 14 having a viscosity no greater than 5000 centipoises at 25° C. and a moisture content as low as 0 but no greater than 0.5%.

17. A novel composition of matter (I) comprising an intimate combination of (A) furfural and (B) an organic reaction product of diacetone alcohol-furfural, the ratio by weight of (A) to (B) being 100 parts of (A) to 100–500 parts of (B).

18. A novel composition defined in claim 17 converted under acidic conditions to the substantially solid and infusible state.

19. A novel composition defined in claim 17 having a viscosity no greater than 5000 centipoises at 25° C. and a moisture content as low as 0 but no greater than 0.5%.

20. A novel composition of matter (I) comprising an intimate combination of (A) furfural and (B) an organic reaction product of acetonyl acetone-furfural, the ratio by weight of (A) to (B) being 100 parts of (A) to 100–500 parts of (B).

References Cited in the file of this patent

UNITED STATES PATENTS

| | | |
|---|---|---|
| 2,363,829 | Caplan et al. | Nov. 28, 1944 |
| 2,461,510 | Harvey | Feb. 15, 1949 |